(12) United States Patent
Sure et al.

(10) Patent No.: US 10,343,792 B1
(45) Date of Patent: Jul. 9, 2019

(54) LED LIGHTING DEVICES WITH PAR FORM FIT

(71) Applicant: HONEYWELL INTERNATIONAL INC., Morris Plains, NJ (US)

(72) Inventors: Anita Sure, Karnataka (IN); Raghuveer Hanumanthrao Desai, Karnataka (IN); Bharath Kumar Kabbur, Karnataka (IN); Sunit Kumar Saxena, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/847,071

(22) Filed: Dec. 19, 2017

(51) Int. Cl.
| | |
|---|---|
| *B64D 47/02* | (2006.01) |
| *B64D 47/04* | (2006.01) |
| *F21V 7/04* | (2006.01) |
| *F21V 29/51* | (2015.01) |
| *F21Y 105/18* | (2016.01) |
| *F21Y 115/10* | (2016.01) |

(52) U.S. Cl.
CPC .............. *B64D 47/04* (2013.01); *F21V 7/041* (2013.01); *F21V 29/51* (2015.01); *F21Y 2105/18* (2016.08); *F21Y 2115/10* (2016.08)

(58) Field of Classification Search
CPC .. B64D 47/04; B64D 47/06; B64C 2027/8236
USPC ........................................................ 362/470
See application file for complete search history.

(56) References Cited

U.S. PATENT DOCUMENTS

| | | | |
|---|---|---|---|
| 7,784,969 B2 | 8/2010 | Reisenauer et al. | |
| 8,851,718 B2 | 10/2014 | Jha et al. | |
| 2010/0091507 A1 | 4/2010 | Li et al. | |
| 2010/0290222 A1* | 11/2010 | Pickard | F21V 7/0008 362/235 |
| 2012/0140498 A1 | 6/2012 | Fabbri et al. | |
| 2013/0039070 A1* | 2/2013 | Mathieu | F21V 7/0008 362/294 |
| 2013/0107513 A1 | 5/2013 | Lundberg et al. | |
| 2013/0155706 A1 | 6/2013 | Jha et al. | |

(Continued)

OTHER PUBLICATIONS

Hoffman LED PAR 64 (received by the undersigned on Sep. 28, 2017).

(Continued)

*Primary Examiner* — Ahshik Kim
(74) *Attorney, Agent, or Firm* — Lorenz & Kopf, LLP

(57) ABSTRACT

A lighting device for a vehicle. The lighting device has a PAR form fit, and includes a housing with a circumferential wall. The circumferential wall has an inner surface, an outer surface and an opening for light emission. The device includes a plurality of light emitting semiconductor devices. The plurality of light emitting semiconductor devices are mounted on a surface of a substrate such that the peak emitted light intensity direction of each one of the plurality of light emitting semiconductor devices is directed toward the central axis. A second surface of the substrate is in thermal contact with the inner surface of the circumferential wall. The device also includes a plurality of curved reflecting surfaces arranged between the plurality of light emitting semiconductor devices and the central axis, arranged to reflect light emitted by the plurality of light emitting semiconductor devices through the opening.

20 Claims, 12 Drawing Sheets

(56) References Cited

U.S. PATENT DOCUMENTS

2016/0273741 A1* 9/2016 Jung .................. F21V 19/0055
2017/0137148 A1   5/2017 Jha et al.

OTHER PUBLICATIONS

Hoffman Introduces First PAR64 LED Aircraft Landing Lights; http://www.aviationpros.com/press_release/10888276/hoffman-introduces-first-par64-led-aircraft-landinglights; Retrieved from Internet Oct. 15, 2015.
El-Gharabawy, A; LED Landing Lights Design, Certification & Production Financial & Technical Feasibility Study; May 8, 2013.
LED PAR64 Bulb Replacement; 751-1005 Bulb; http://www.hoffmanengineering.com/Lighting-from-Hoffman-Engineering/Aircraft-Lighting-from-Hoffman-Engineering/LED-PAR64-Bulb-Replacement; Retrieved from Internet Dec. 15, 2017.
Talon Aerospace LED Lighting Solutions; http://www.talonaerospace.com/products/commercial/sealedbeam/22-part/61-led-par-64-landing-light-br-tae0728-1; Retrieved from Internet Oct. 15, 2015.
Oxley LED PAR 64 (received by the undersigned on Sep. 28, 2017).
Parmetheus Plus Series PAR36—Whelen Engineering Aviation; http://www.whelen.com/aviation/product.php?head_id=13&prod_id=197; Retrieved from Internet Oct. 15, 2015.
Sealed Beam Replacement Lamps—LED, LED Par 64 Landing Light, TAE0728-1; http://www.talonaerospace.com/products/commercial/sealedbeam/22-part/61-led-par-64-landing-light-br-tae0728-1; Retrieved from Internet Dec. 15, 2017.

* cited by examiner

US 10,343,792 B1

LED LIGHTING DEVICES WITH PAR FORM FIT

TECHNICAL FIELD

The present disclosure generally relates to lighting devices for vehicles, and more specifically relates to lighting devices for aircraft, the lighting devices having a Parabolic Aluminized Reflector (PAR) form fit.

BACKGROUND

Vehicle lighting devices, such as lighting devices for aircraft, are known. Lighting devices are generally required on aircraft for use as landing lights, taxi lights, search lights and so on. These lighting devices are used, for example, to better illuminate the runway during take-off and landing during low-light conditions.

A common type of lighting device used in these applications is the Parabolic Aluminized Reflector (PAR) lighting device. As used herein, the term "PAR form fit" is used in its conventional manner to describe the various types of lighting form fits for PAR fittings, which include PAR64, PAR56, PAR46, PAR38, PAR36 fittings, and so on. Devices which are adapted to have a PAR form fit are required to fit into an associated PAR fitting, such as the PAR fittings in certain aircraft canopies.

Presently, most lighting devices having a PAR form fit incorporate incandescent bulbs. Incandescent bulbs are generally less reliable and less power-efficient than LED-based lighting solutions. Although some LED-based lighting solutions exist, it is desirable to improve the efficiency and reliability of existing solutions.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

In an embodiment, there is provided a lighting device for a vehicle, the lighting device having a PAR form fit. The lighting device includes a housing comprising a circumferential wall. The circumferential wall has an inner surface, an outer surface, a central axis, and an opening for light emission. The lighting device includes a plurality of light emitting semiconductor devices. Each one of the plurality of light emitting semiconductor devices is mounted on a first surface of a substrate such that the peak emitted light intensity direction of each one of the plurality of light emitting semiconductor devices is directed substantially toward the central axis. A second surface of the substrate is in thermal contact with the inner surface of the circumferential wall. A plurality of curved reflecting surfaces are arranged between the plurality of light emitting semiconductor devices and the central axis. The plurality of curved reflecting surfaces are arranged to reflect light emitted by the plurality of light emitting semiconductor devices through the opening of the circumferential wall.

In an embodiment, there is provided a vehicle comprising a canopy. The canopy includes a lighting device. The lighting device includes a housing comprising a circumferential wall. The circumferential wall has an inner surface, an outer surface, a central axis, and an opening for light emission. The lighting device includes a plurality of light emitting semiconductor devices. Each one of the plurality of light emitting semiconductor devices is mounted on a first surface of a substrate such that the peak emitted light intensity direction of each one of the plurality of light emitting semiconductor devices is directed substantially toward the central axis. A second surface of the substrate is in thermal contact with the inner surface of the circumferential wall. A plurality of curved reflecting surfaces are arranged between the plurality of light emitting semiconductor devices and the central axis. The plurality of curved reflecting surfaces are arranged to reflect light emitted by the plurality of light emitting semiconductor devices through the opening of the circumferential wall.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. Furthermore, there is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
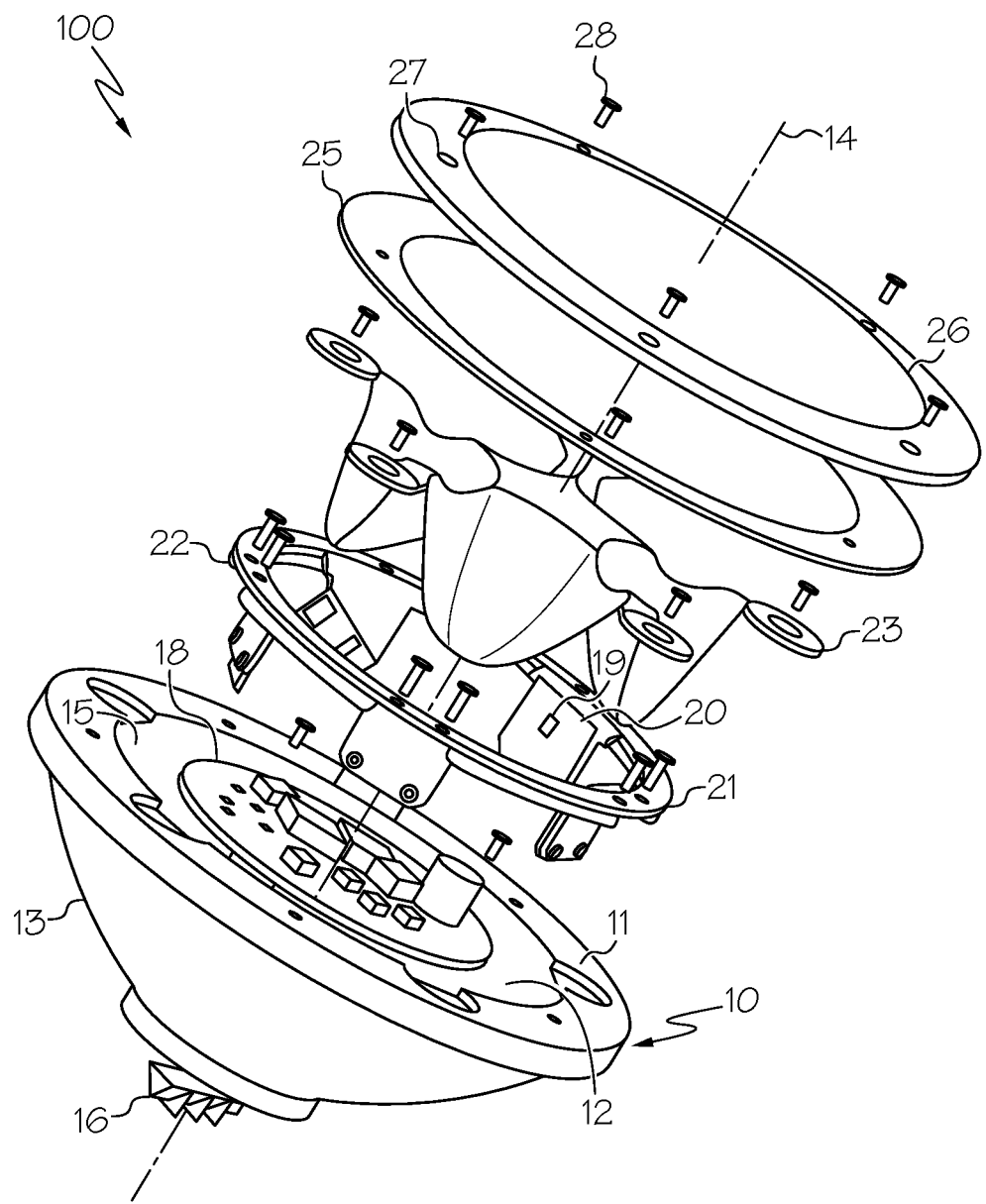
FIG. 1 is an exploded-view drawing of a lighting device in accordance with various embodiments.

With reference to FIG. 1, an exploded view of a lighting device 100 for a vehicle, for example an aircraft, is shown. The lighting device 100 includes a housing 10 that has a circumferential wall 11 surrounding a central axis 14. The circumferential wall 11 has an inner surface 12 and an outer surface 13. The circumferential wall 11 also has an opening 15, through which opening 15 light is reflected, as will be explained in detail further below. In an embodiment, the opening 15 is substantially circular. In an alternative embodiment, the opening 15 has a polygonal shape having more than four sides, such as a a pentagonal, hexagonal or octagonal shape. The housing 10 has a PAR form fit.

In an embodiment, a connector 16 is present at one end of the housing 10. In an embodiment, the connector 16 is configured to electrically connect components of the lighting device 100 to an external power supply (not shown) when the lighting device 100 is fitted into a PAR fitting. In another embodiment, the connector 16 also provides for a physical connection between the housing 10 and the PAR fitting to fixedly secure the housing 10 to the PAR fitting as well as providing an electrical connection. In yet another embodiment, the connector 16 may only provide a physical connection, and a power supply (not shown) is incorporated into the lighting device 100, as will be explained below.

In an embodiment, the connector 16 is electrically connected to a power supply board 18 disposed within the housing 10. The power supply board 18 is configured to transfer power from the external power supply to components of the lighting device 100. In an alternative embodiment, the power supply board 18 is connected to an internal power supply that is incorporated within the housing 10, and is configured to transfer power from the internal power supply to the components of the lighting device 100.

In various embodiments, a bracket 21 is also disposed within the housing 10. As shown in FIG. 1, the bracket 21 is configured to securely hold multiple semi-conducting light emitting devices 19 in specific positions within the housing 10. In an embodiment, the semi-conducting light emitting devices 19 are light emitting diodes (LEDs), and will henceforth be referred to herein as such. In the embodiment of FIG. 1, the bracket 21 holds multiple LEDs 19 in an orientation such that the peak emitted light intensity direction of each one of the LEDs 19 is directed toward the central axis 14. In an embodiment, the peak emitted light intensity direction of each one of the LEDs 19 is perpendicular to the central axis 14 of the housing 10.

As can also be seen in FIG. 1, each one of the LEDs 19 is held in position, at least indirectly, by the bracket 21. Furthermore, each one of the LEDs 19 is also mounted to a first side of a substrate 20. In an embodiment, the substrate is as a PCB board. In an embodiment, each one of the LEDs 19 is mounted on an individual substrate. In another embodiment, all LEDs 19 are mounted on a single substrate, for example a flexible PCB board or an inflexible polygonal shaped PCB, as will be explained further below with reference to FIGS. 4A and 4B. The LEDs 19 are electrically connected to an internal or external power supply. In an embodiment, the LEDs 19 are connected to the power supply with electrically conducting tracks formed on the substrate. In another embodiment, this electrical connection is achieved using wires. In other words, the substrate 20 is electrically connected to the connector 16 and each one of the LEDs 19 such that power from an external power source may be supplied, via the connector 16 and the substrate 20, to each one of the LEDs 19. In an alternative embodiment, the substrate 20 is electrically connected to each one of the LEDs 19 and a power supply that is positioned within the circumferential wall 11 of the housing 10. Other types of substrates, instead of a PCB board, may alternatively be used, as explained in more detail below.

Figure 2:
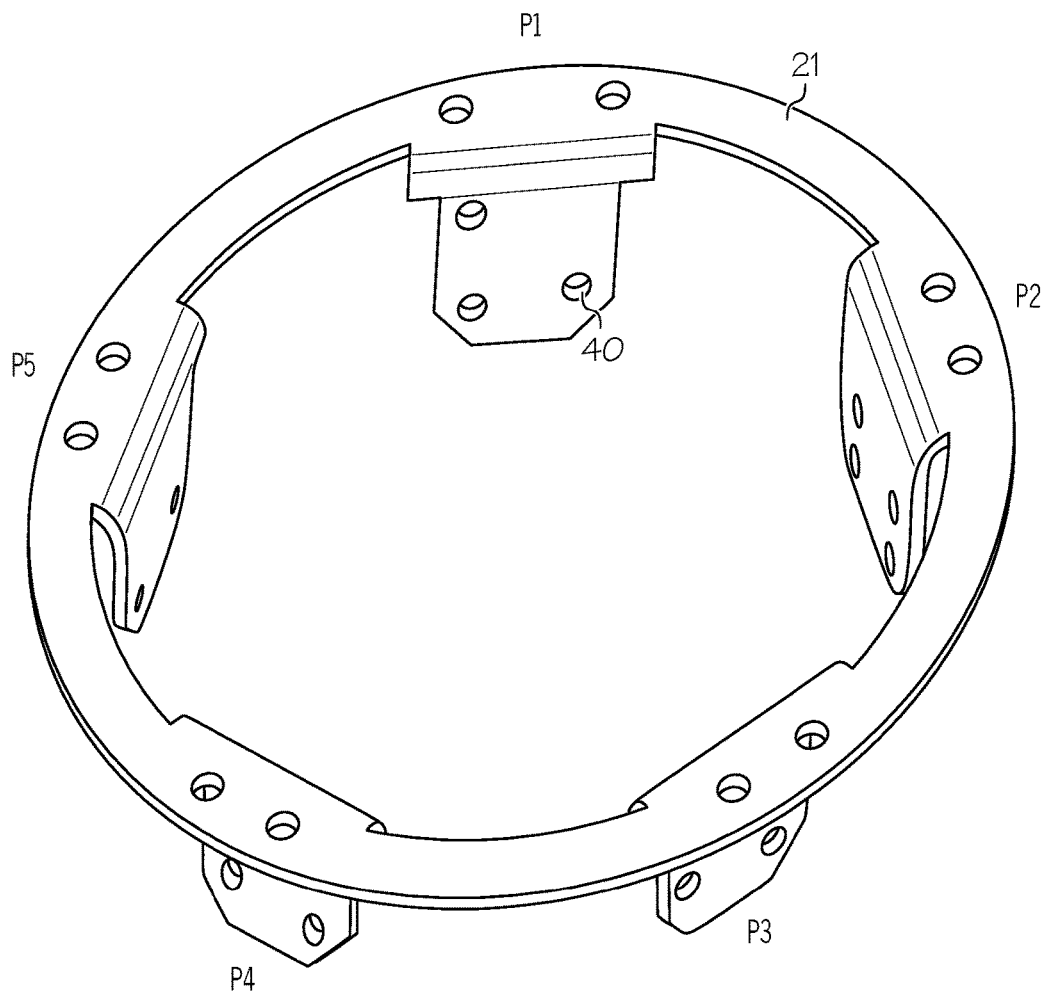
FIG. 2 shows a bracket in accordance with various embodiments.

The bracket 21 used in the embodiment of FIG. 1 is shown in greater detail in FIG. 2. As can be seen, the bracket 21 may be configured to hold the LEDs in specific spatial positions P1 to P5. These positions P1 to P5 allow for a wide range of beam patterns to be achieved simply by replacing the types of LED at each position, as explained further below. As shown in FIG. 2, the bracket comprises holes 40 for mounting LEDs 19. Each position P1 to P5 may comprise multiple holes 40, for fine-tuning the position of the LEDs 19 in the bracket 21.

Figure 3:
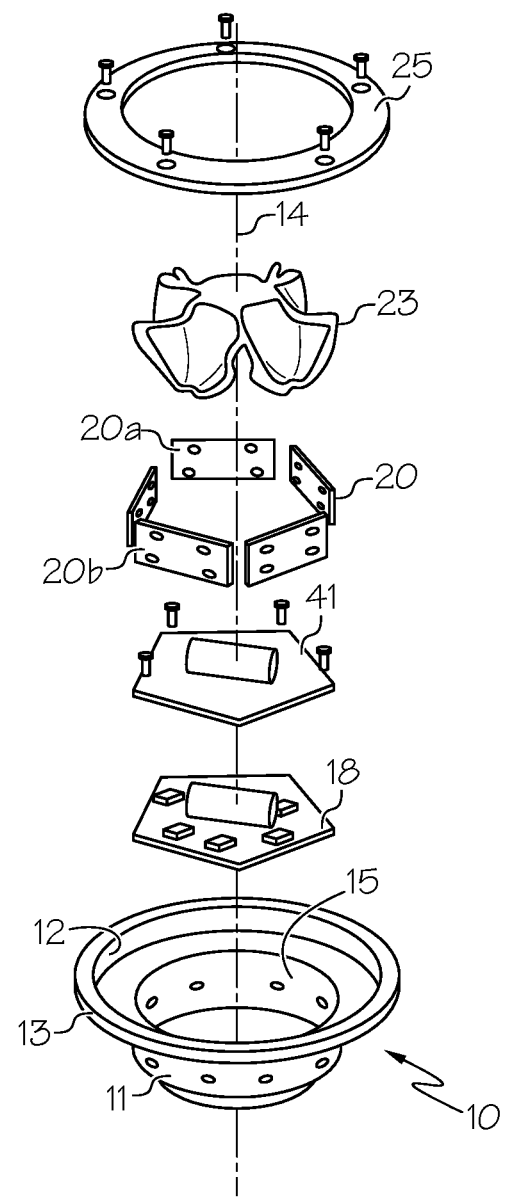
FIG. 3 shows another exploded-view drawing of a lighting device in accordance with various embodiments.

Turning now to FIG. 3, in some embodiments one or more substrates 20 may be used instead of the bracket 21 to position and hold the LEDs 19 in specific positions within the housing 10. Specifically, each substrate 20 may be designed both to securely hold each one of the LEDs 19 in an orientation such that the peak emitted light intensity direction of each one of the LEDs 19 is directed toward the central axis 14 of the circumferential wall 11, and also to transfer power from an internal or external power supply to each one of the LEDs 19.

As shown in each of FIG. 1 and FIG. 3, substrates 20 such as PCB boards are positioned circumferentially disposed around reflectors 23. The reflectors 23 comprise a plurality of reflecting surfaces to reflect light emitted from the LEDs 19 out of the opening 15, as explained in more detail further below. LEDs 19 may be mounted to a first side 20a of the substrates, for example via soldering. In the embodiment shown in FIG. 3, a cover 41 is positioned between the substrates 20 and the power supply board 18. In an embodiment, the cover 41 is formed form an insulating material. In another embodiment, the cover 41 is metallic, so that the cover 41 provides EMI shielding. In other embodiments, no cover is present.

The second side 20b of each substrate 20 is in thermal contact with the interior surface 12 of the circumferential wall 11 of the housing 10. By positioning each substrate 20 such that the second side 20b of each substrate 20 is in thermal contact with the interior surface 12 of the circumferential wall 11, good thermal management is achieved, as explained below.

In particular, a portion of the electrical energy supplied to an LED is converted into light. Some of the remaining electrical energy supplied to the LED is converted into heat. In general, excess heat reduces the efficiency of an LED, such that, at temperatures higher than a desired operating temperature range for the LED, less light is produced by the LED for a given amount of electrical energy. Furthermore, when operating at these higher temperatures, the LED may fail entirely. It is therefore desirable to regulate the temperature of the LED to thereby reduce the likelihood of the LED operating in temperatures that are higher than the desired operating temperature range.

By making the thermal path from the LED 19 (which may be considered as a heat source) to the exterior of the circumferential wall 11 (the exterior of which may be considered as a heat sink) short, the heat dissipation away from the LED 19 and to the exterior of the circumferential wall 11 is improved. In particular, by positioning each of the LEDs 19 such that the second side 20b of the substrate 20 is in thermal contact with the interior surface 12 of the circumferential wall 11, heat can be quickly conducted away from each LED 19, and then through the substrate 20 and the circumferential wall 11 of the housing 10 to the exterior of the circumferential wall 11, thereby allowing for improved regulation of the temperature of the LEDs.

The positioning of the substrates 20 as shown in FIGS. 1 and 3 therefore allows for a shorter thermal conductive path. This shorter thermal conductive path allows for improved thermal management of the LEDs 19 that are mounted on those substrates 20 as compared to lighting devices in which LEDs are differently positioned. In particular, different positioning of the LEDs may increase the thermal resistance along the path from each LED to the ambient, thereby leading to inferior thermal management. The lighting devices as disclosed herein therefore allow for a longer lifespan of the LEDs 19, and also for increased efficiency (i.e., a larger number of lumens generated per LED per watt delivered).

Furthermore, with lighting devices in which LEDs are positioned in the center of a housing, or are positioned with the peak emitted light intensity direction of the LEDs being parallel to the central axis of the housing, the heat generated by the LEDs may be transferred to a heat sink via a thermal path that has a high thermal impedance. This may cause undesired triggering of compensation techniques in the LED circuits, such as thermal foldback, thereby decreasing the current available to the LEDs.

As such, the improved thermal management achieved by the lighting device 100 allows for an increase in the current supplied to the LEDs 19 without the LEDs being heated to beyond a desired operating temperature as compared to less thermally efficient lighting devices.

Figure 4A:
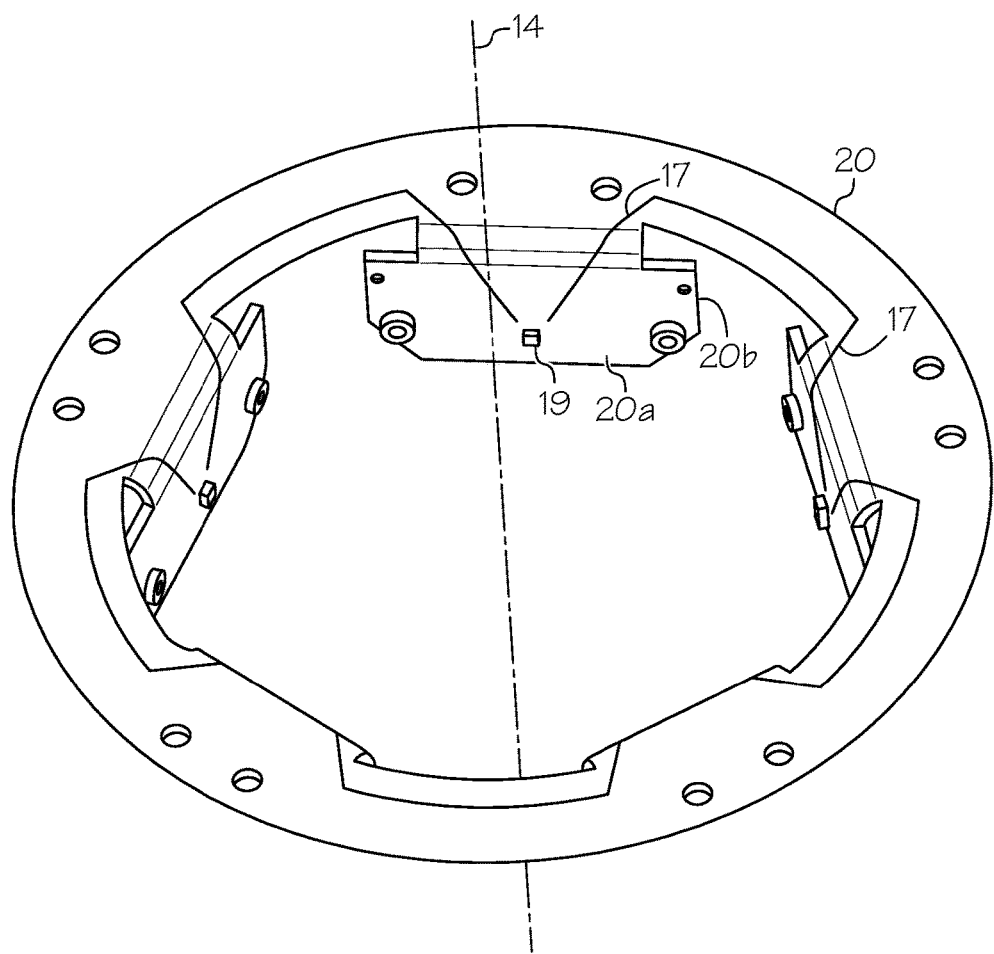
FIGS. 4A and 4B show drawings of substrates in accordance with various embodiments.
Figure 4B:
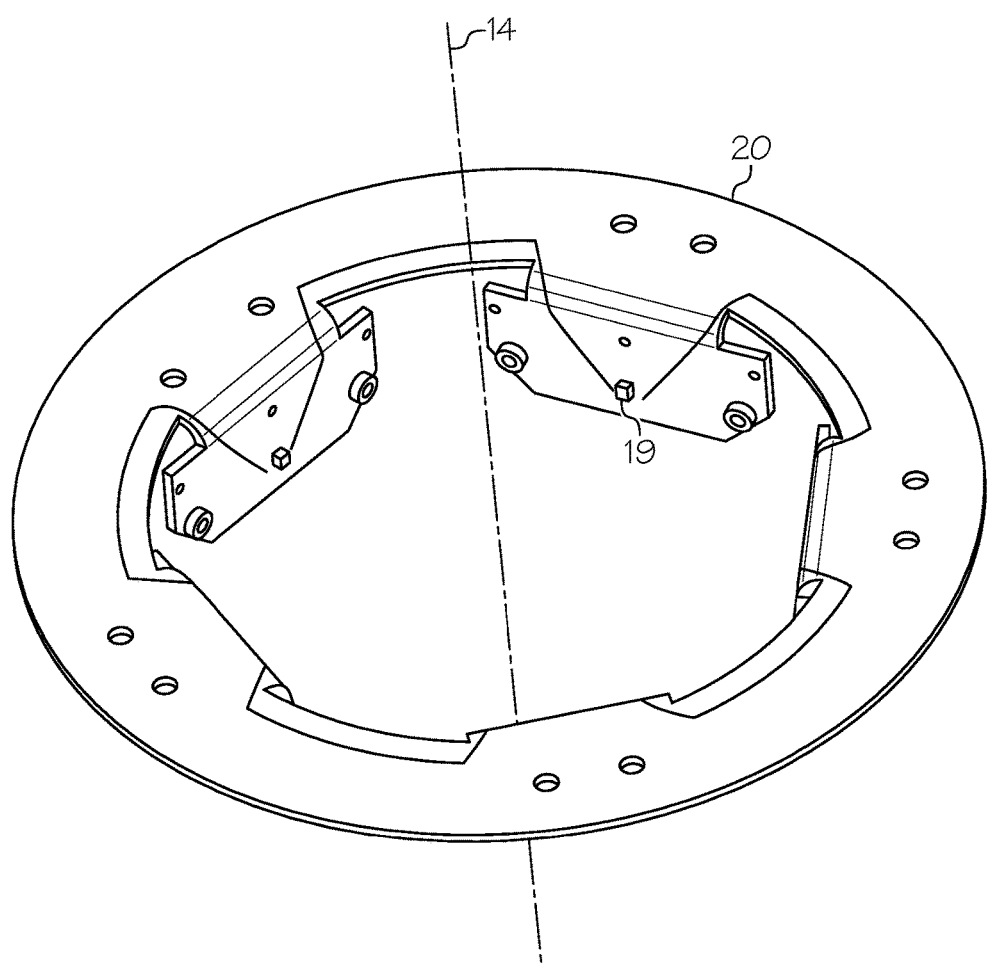

Turning now to FIGS. 4A and 4B, another embodiment of the substrate 20 is shown. In particular, each of the LEDs 19 may be mounted on a single substrate 20. This single substrate 20 may a single bent substrate. In one embodiment, the single substrate 20 is formed from a thermally conductive material, such as IMS (insulated metal substrates), MCPCBS (metal core printed circuit boards) or MIBPCBS (metal-in-board printed circuit boards). Other thermally conductive materials are also contemplated as the material for the single substrate 20. As used herein, the term "thermally conductive material" is used to describe materials that have been selected for their relatively higher thermal conductivity value as compared to conventional substrate materials, such as PCB boards. The use of multiple thermally conductive substrates 20 is also contemplated herein. For example, each of the substrates 20 shown in FIG. 3 may be formed from a thermally conductive material. The use of one or more thermally conductive substrates 20 improves thermal management in the lighting device 100.

It is generally difficult to form conducting tracks on a bent substrate 20. If conducting tracks cannot be formed on the substrate 20, wires 17 may be used to electrically connect the LEDs 19 to the power supply board 18.

In various embodiments, other techniques are additionally used to improve thermal management in the lighting device. As shown in FIG. 1, a heat diffuser 22 may be disposed in the lighting device 100 to further improve the dissipation of heat away from the LEDs 19, and thereby further reduce temperature gradients present inside the lighting device 100. As shown in FIG. 1, the heat diffuser 22 may be attached to the bracket 21. Alternatively, the heat diffuser 22 may be attached to an alternative element of the lighting device, such as the substrate 20 or the circumferential wall 11. In an embodiment, the heat diffuser 22 is a heat pipe of conventional design, with a small quantity of working fluid disposed inside the heat pipe. Heat in a particular area (such as close to an LED 19) is absorbed by vaporizing the working fluid. The vapor flows to a cooler location along the heat pipe, where it condenses, releasing the stored heat. The condensed working fluid is then transferred back to the hotter location, for example by a wicking force. In an alternative embodiment, the heat diffuser 22 may be formed from a material with a high thermal diffusivity value (such as copper or graphite), and may be attached to the bracket 21 or substrate 20 to even out the thermal temperature gradients inside the lighting device 100.

Because each one of the LEDs 19 is positioned with the peak emitted light intensity direction being directed toward the central axis for thermal management reasons, reflectors 23 are required in order to change the direction of the light emitted from the LEDs 19. As can be seen in FIG. 1, reflectors 23 are positioned between each LED 19 and the central axis 14. Specifically, each reflector 23 is arranged between an LED 19 and the central axis 14 to thereby reflect light emitted by each LED 19 through the opening 15 of the circumferential wall 11 of the housing 10, such that a light beam can be formed.

Another view of the relative positions of the reflectors 23 and the LEDs 19 is shown in FIG. 3. As can be seen in FIG. 3, the reflectors 23 are positioned between the LEDs 19 and the central axis 14 in order to reflect the light emitted from the LEDs 19 out of the opening 15 of the circumferential wall 11 of the housing 10.

Figure 5:
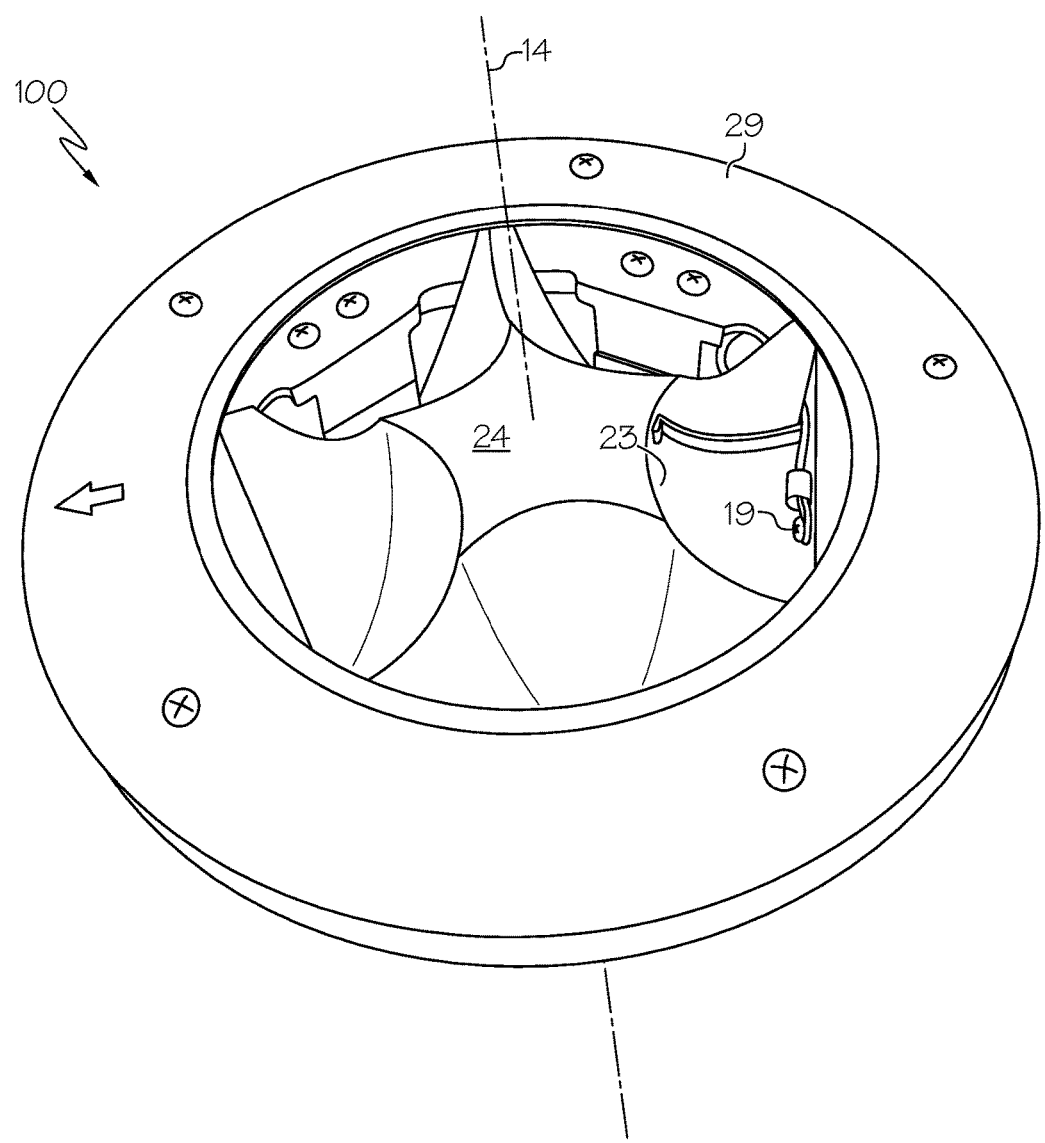
FIG. 5 shows a picture of the lighting device in accordance with various embodiments.

Turning now to FIG. 5, which shows a picture of an assembled lighting device 100, it can be seen that the reflectors 23 are arranged between the LEDs 19 and the central axis 14 of the circumferential wall 11 of the housing 10, such that a central cavity 24 is created between the reflectors 23. The central cavity 24 may be used to house other components of the lighting device, such as an internal power supply or sensors, or other components to add additional functionality to the lighting device. By providing a central cavity 24 to house other components of the lighting device, even relatively bulky components such as switched-mode power supplies may be incorporated into the central cavity 24 of the lighting device 100 without increasing the overall size of the lighting device 100. As such, the provision of a central cavity 24 allows for improved space utilization in the lighting device 100.

Figure 6:
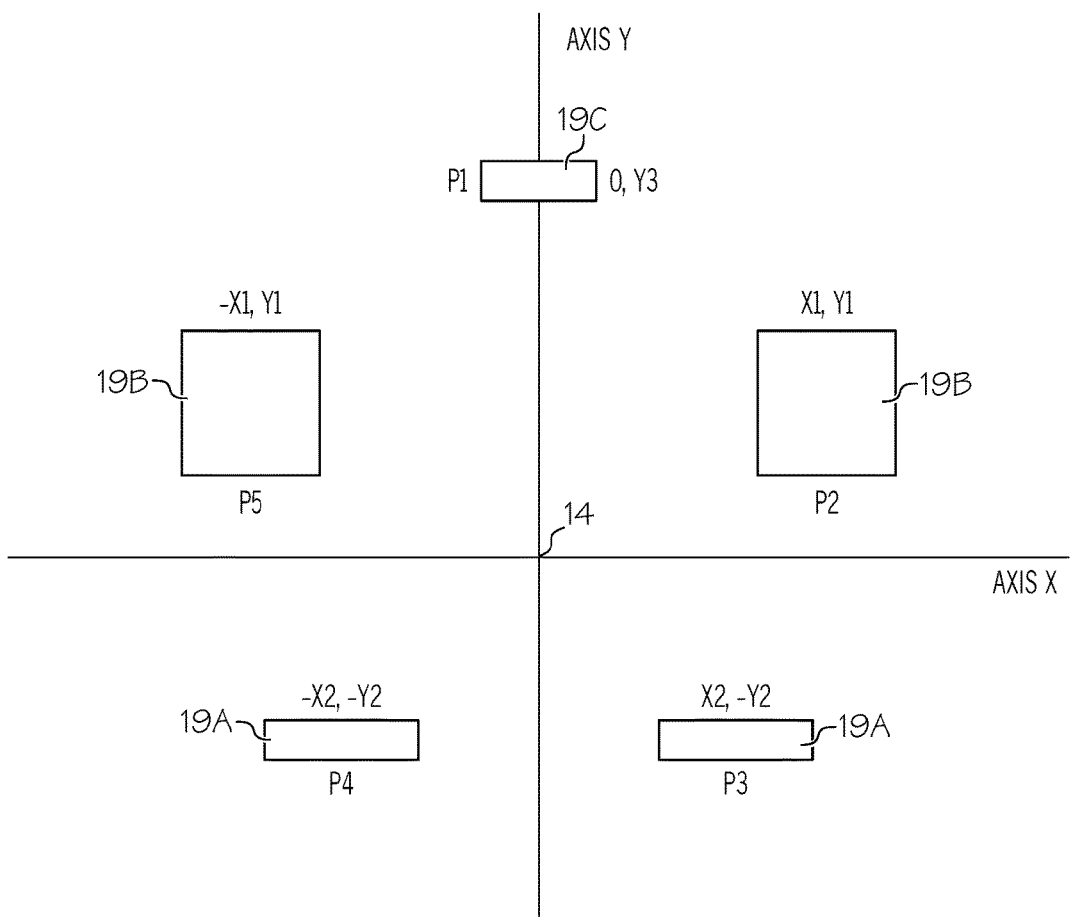
FIG. 6 is a representation of LED positions in the lighting device of various embodiments.

Referring to FIG. 6, the positions P1 to P5 for the LEDs of the lighting device 100 are represented on a graph.

In particular, as can be seen in the representative graph of FIG. 6, the positions P1 to P5 are arranged in a substantially circular manner relative to the central axis 14 (which on this graph passes through at location 0,0, in a direction perpendicular to the plane x,y of the graph). In particular, the position P1 is positioned on the representative y axis (for example, at co-ordinates 0, Y3), the positions P2 and P5 are positioned symmetric to the y axis and above the x axis (for example, at co-ordinates X1, Y1 and −X1, Y1, respectively), and the positions P3 and P4 are positioned symmetric to the y axis and below the x axis (for example, at co-ordinates X2, −Y2 and −X2, −Y2, respectively). The overall arrangement of the positions P1 to P5 may therefore be described as substantially circular about the central axis 14, since these locations lie on the circumference of a hypothetical circle drawn on this representative graph. These positions P1 to P5 are unique in that, when LEDs are incorporated into at least some of these circularly arranged positions P1 to P5 in the lighting device 100, a symmetric beam pattern is produced.

The positions P1 to P5 may house different types of LEDs 19. In the embodiment shown in FIG. 6, square LEDs 19B, such as CREE XHP35 LEDs, are incorporated at positions P2 and P5, and rectangular LEDs 19A, such as OSRAM Ostar LEDs, are incorporated at positions P3 and P4. This LED configuration results in a "medium" beam pattern type, the properties and specifications of which are known in the art. In another embodiment, rectangular LEDs may be positioned at each of positions P2 to P5. Such a configuration will result in a narrow beam pattern type, the properties and specifications of which are also known in the art. In yet another embodiment, square LEDs may be positioned at each of positions P2 to P5. Such a configuration will result in a wide beam pattern type, the properties and specifications of which are also known in the art. In other embodiments, square and rectangular LEDs are positioned at non-symmetric locations inside the housing 10 in order to produce different shapes of beam patterns, depending on the desired functionality.

Each of the above configurations for the narrow, medium and wide beam pattern types requires there to be LEDs 19 at each of positions P2 to P5. The type of LED mounted at position P1 may be selected for different reasons. In an embodiment, position P1 is left unpopulated. In another embodiment, position P1 is populated with a square LED to enhance the emitted beam's width. In yet another embodiment, position P1 is populated with a rectangular LED for increasing the peak intensity of the emitted beam. In still yet another embodiment, position P1 is populated with an infra-red (IR) LED 19C, whilst positions P2 to P5 are populated with visible light LEDs. This allows for dual-IR and visible light operation of the lighting device. Other types of LED are also contemplated at position P1. In particular, the type of LED included at this position may be chosen according to the desired functionality of the lighting device.

Figure 7A:
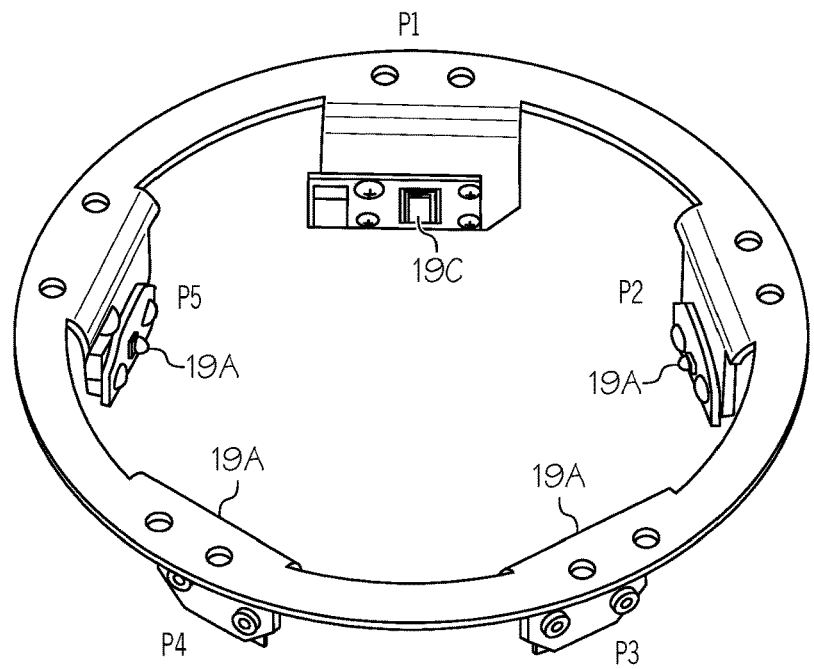
FIGS. 7A to 7C show various LED configurations using the bracket of various embodiments.
Figure 7B:
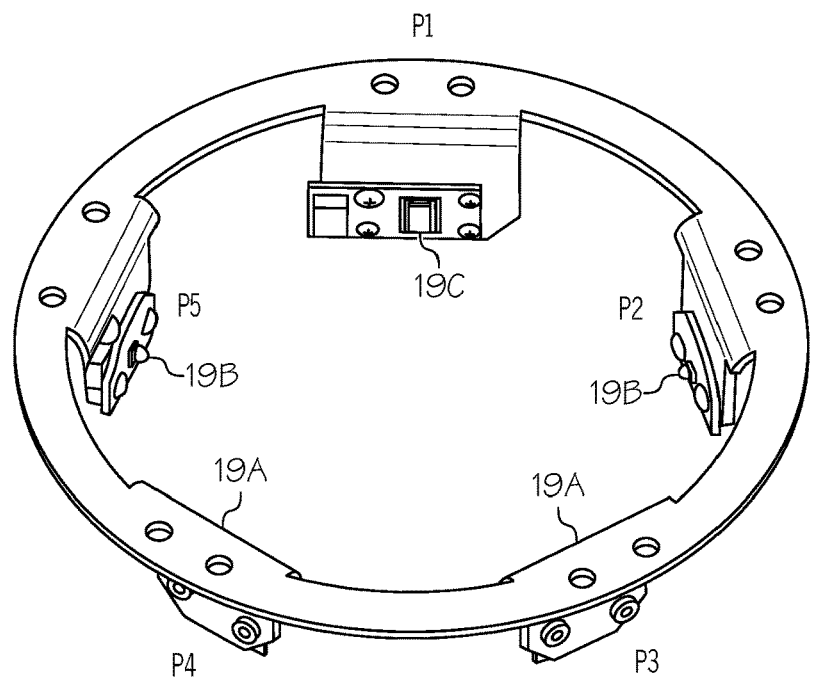
Figure 7C:
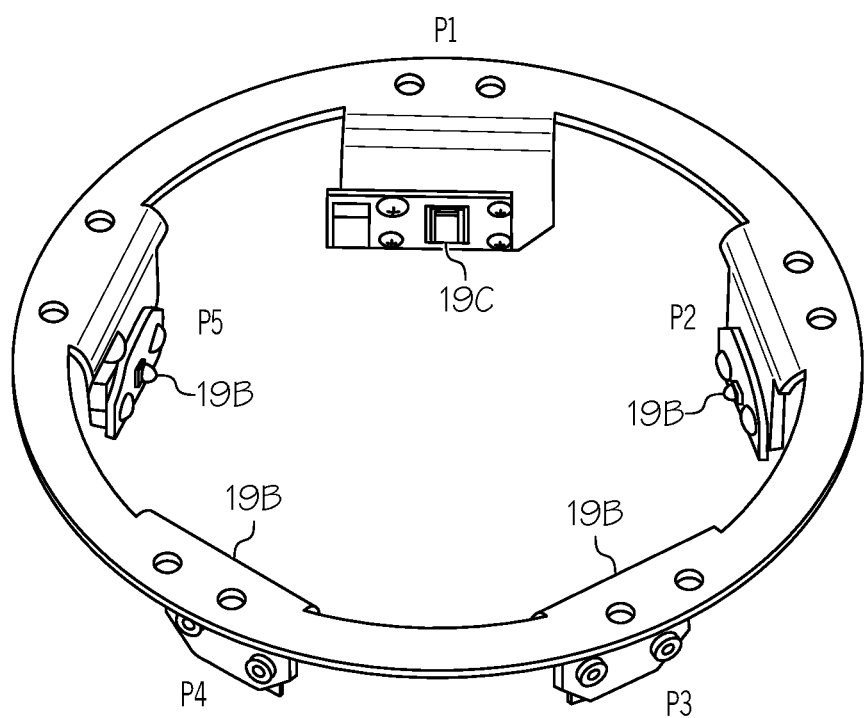

FIGS. 7A, 7B and 7C show representations of the three different types of LED configurations that produce narrow, medium and wide beam patterns, respectively. In the embodiment of FIG. 7A, rectangular LEDs 19A are mounted at positions P2 to P5 and an IR LED 19C is mounted at position P1, resulting in a dual-mode narrow beam pattern. In the embodiment of FIG. 7B, rectangular LEDs 19A are mounted at positions P3 and P4, square LEDs 19B are mounted at positions P2 and P5, and an IR LED 19C is incorporated at position P1, resulting in a dual-mode medium beam pattern. Lastly, in the embodiment of FIG. 7C, square LEDs 19B are mounted at positions P2 to P5, and an IR LED 19C is mounted at position P1, resulting in a dual-mode wide beam pattern.

Figure 8:
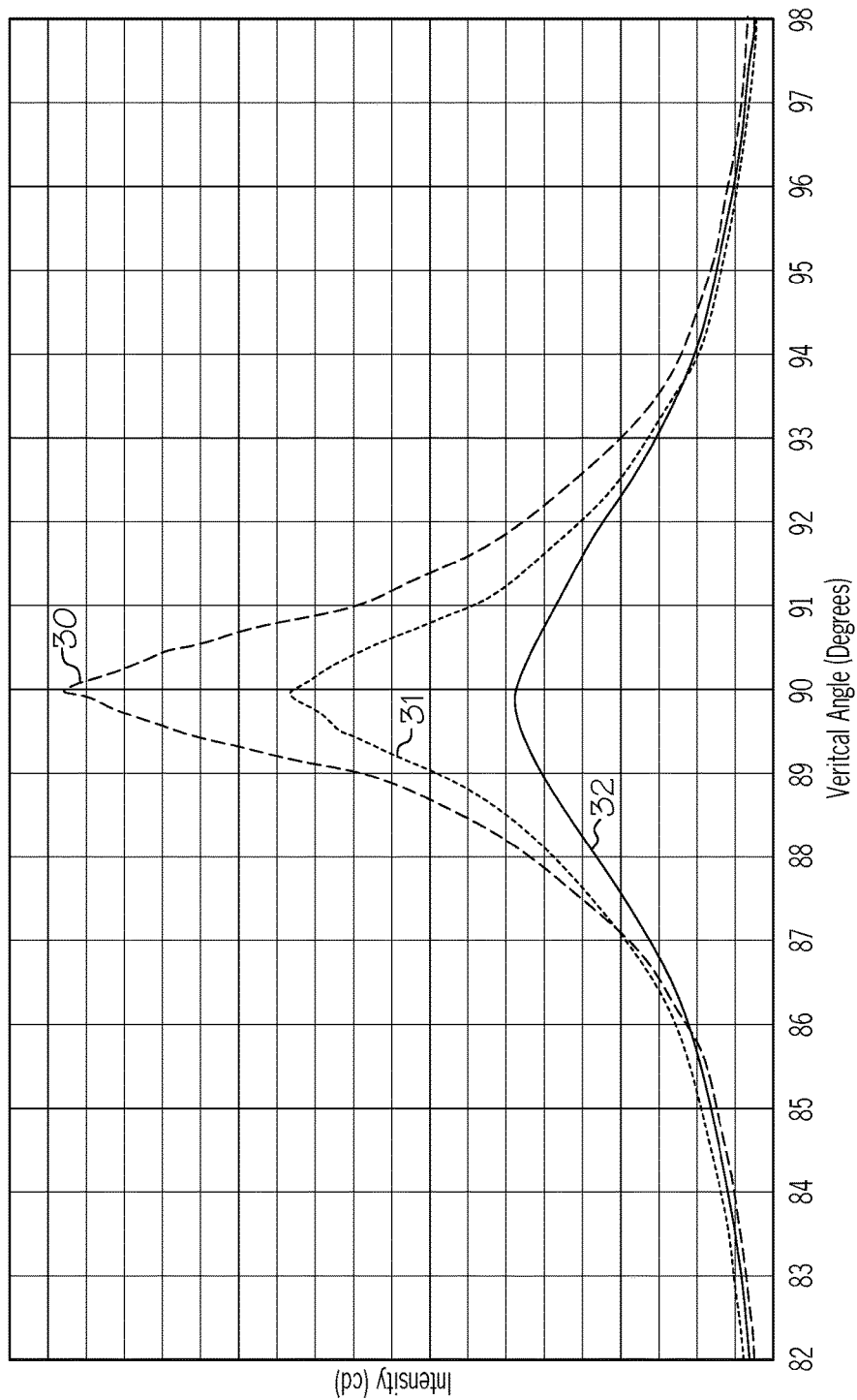
FIG. 8 shows a graph showing the intensity distributions of various LED configurations with respect to beam angle.

The beam intensity to vertical beam angle relationship of each of the narrow, medium and wide beam pattern types is shown in FIG. 8. As can be seen in FIG. 8, all of the emitted beam pattern types are symmetric. In FIG. 8, the narrow beam is shown with the reference number 30, the medium beam is shown with the reference number 31, and the wide beam is shown with the reference number 32.

As demonstrated above, by providing a lighting device 100 with a standardized set of LED positions P1 to P5, a wide variety of beam pattern types may be produced simply by replacing the types of LED at some of these positions. The standardized positions P1 to P5 allow for an increase in the ease of manufacture of different beam types, and also in the ease of repair the lighting device, since the different types of lighting device all have the same underlying structure, and only the types of LED vary between different devices. Furthermore, the overall cost to manufacture the different types of lighting device is decreased, because only the configuration of LEDs need to be changed between different devices, and no new machines or different components are required to manufacture different types of lighting device.

Other LED configurations are also envisaged. In an embodiment, a lighting device 100 is provided with more than five standardized LED positions. For example, a lighting device with more than five of standardized LED positions may be provided.

Returning to the embodiment shown in FIG. 1, a gasket 25 is fitted over the top of the reflectors 23. A lens 26 is positioned over the gasket 25. The central axis 14 is coincident with and parallel to the normal of the lens 26. In an embodiment, the lens is formed from a plastic, such as polycarbonate. As can be seen in this figure, the lens 26 includes small screw holes 27, through which screws 28 are fastened in order to attach the various elements of the lighting device 100 together. In an alternative embodiment, a different fastening technique may be used to attach the components of the lighting device together, such as gluing, welding, brazing, crimping, or using a different type of fastener.

In an embodiment, the lens 26 is transparent and uncoated. In another embodiment, the lens 26 is transparent and coated with a lens coating, such as an anti-reflective, anti-fog and/or scratch resistant coating, or another type of coating. In yet another embodiment, the lens 26 is translucent and/or partially or wholly opaque to certain wavelengths of light. The lens coating may be adapted to the intended function of the lighting device 100.

Figure 9:
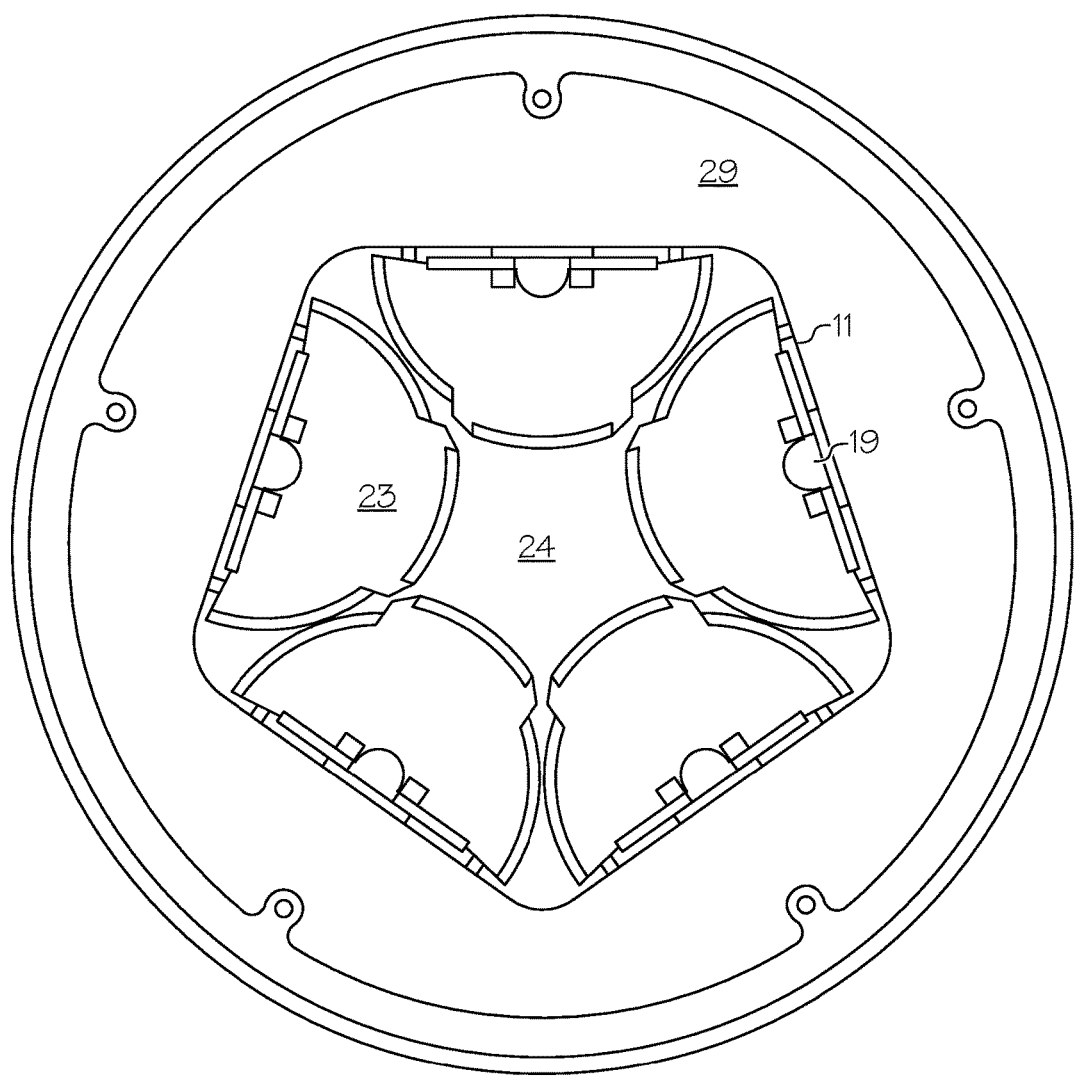
FIG. 9 shows a schematic representation of the lighting device in accordance with various embodiments.

Turning now to FIG. 9, another representation of a lighting device 100 in accordance with various embodiments is shown. In this representation, the central cavity 24 between the reflectors 23 is shown. As explained above, this central cavity 24 may be used to house relatively bulky components without increasing the overall size of the lighting device 100. In an embodiment, a power supply is at least partially disposed within the central cavity 24. In another embodiment, another type of component is partially or fully disposed within the central cavity 24, which other component allows for additional functionality of the lighting device 100. As also shown in the embodiment of FIG. 9 an outer space 29 is disposed circumferentially outside the circumferential wall 11 of the housing 10. The outer space 29 may also be used to house elements of the lighting device, such as sensors, or other components that allow for additional functionality of the lighting device 100.

Figure 10:
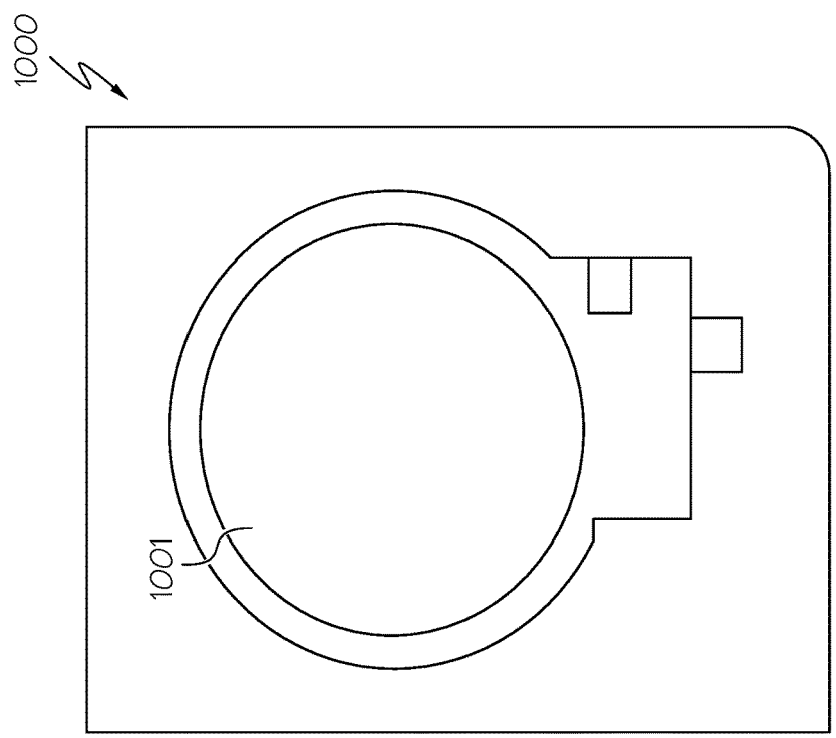
FIG. 10 shows a representation of the lighting device in accordance with various embodiments and the spatial relationship of the lighting device with an aircraft canopy.
Figure 10:
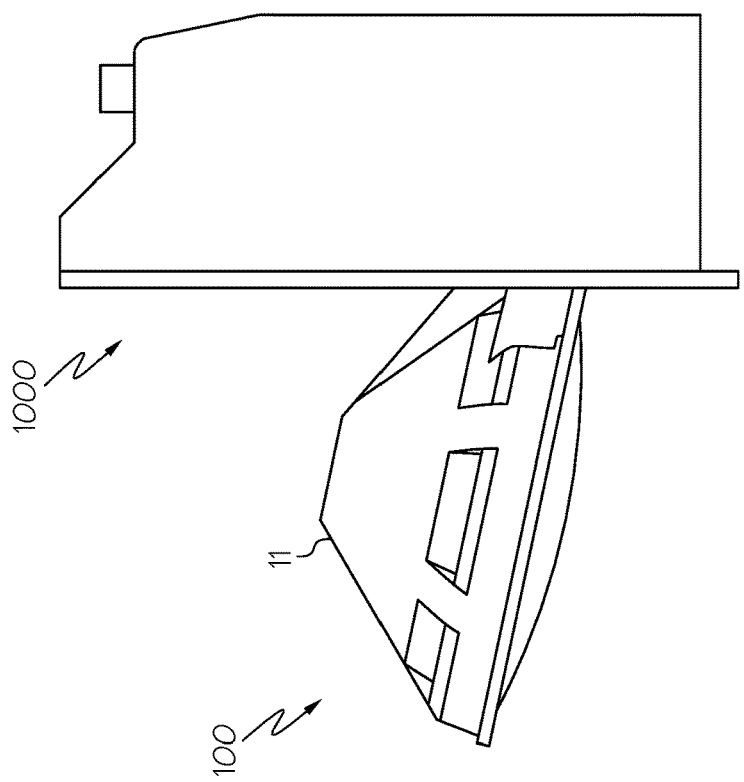

Turning to FIG. 10, a canopy 1000 for receiving the lighting device 100 is shown. The canopy 1000 is adapted for receiving a PAR form fit device, such as a PAR 64 form fit device. In general, the canopy 1000 has a substantially circular opening 1001. In an embodiment, the circumferential wall 11 of the housing 10 of the lighting device 100 has a corresponding substantially circular opening 15. In other embodiments, the circumferential wall 11 of the housing 10 may have a polygonal opening of more than four sides, such as a pentagonal, hexagonal, or octagonal opening. The circumferential wall 11 of the housing 10 is adapted to be in close proximity to, or in direct contact with, the inner surface of the canopy 1000. This allows for an increase in the thermal contact area between the inner surface of the canopy 1000 and the outer surface 12 of the circumferential wall 11 of the housing 10, and the thermal conduction away from the LEDs 19 can therefore be improved.

It has been found that a polygonal opening with only four sides, such as a square or rectangular opening, does not provide a good thermal contact between the circumferential wall and the canopy 1000. As such, in the embodiments where the circumferential wall 11 has a polygonal opening, the polygonal opening must have more than four sides. As shown in FIG. 10, in embodiments where the circumferential wall 11 has a substantially circular opening 15, the circumferential wall 11 of the housing 10 may have a truncated conical shape adapted to fit into the canopy 1000.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A lighting device for a vehicle, the lighting device having a PAR form fit and comprising:
   a housing comprising a circumferential wall, the circumferential wall having an inner surface, an outer surface, a central axis, and an opening for light emission;
   a plurality of light emitting semiconductor devices, wherein each one of the plurality of light emitting semiconductor devices is mounted on a first surface of a substrate such that a peak emitted light intensity direction of each one of the plurality of light emitting semiconductor devices is directed substantially toward the central axis, and wherein a second surface of the substrate is in thermal contact with the inner surface of the circumferential wall; and
   a plurality of curved reflecting surfaces arranged between the plurality of light emitting semiconductor devices and the central axis, wherein the plurality of curved reflecting surfaces are arranged to reflect light emitted by the plurality of light emitting semiconductor devices through the opening of the circumferential wall.

2. The lighting device of claim 1, further comprising a heat diffuser arranged to transfer heat away from each one of the plurality of light-emitting semiconductor devices.

3. The lighting device of claim 2, wherein the heat diffuser comprises a heat pipe.

4. The lighting device of claim 1, wherein each one of the plurality of light emitting semiconductor devices is mounted on the first surface of the substrate such that the peak emitted light intensity direction is perpendicular to central axis.

5. The lighting device of claim 1, wherein the plurality of light emitting semiconductor devices are mounted in a substantially circular arrangement about the central axis.

6. The lighting device of claim 1, wherein at least one of the light emitting semiconductor devices comprises an infrared LED.

7. The lighting device of claim 1, wherein each one of the plurality of curved reflecting surfaces comprises a reflecting surface directed toward a respective light emitting semiconductor device and a rear surface directed toward the central axis, and the plurality of curved reflecting surfaces are arranged such that a central cavity is defined at least partially by the rear surfaces.

8. The lighting device of claim 7, further comprising a power supply at least partially disposed within the central cavity.

9. The lighting device of claim 1, wherein the substrate is formed from a thermally conductive material.

10. The lighting device of claim 1, wherein the housing is sized and adapted to have a PAR 64 form fit.

11. The lighting device of claim 1, further comprising a lens arranged over the opening of the circumferential wall.

12. The lighting device of claim 10, further comprising a lens coating disposed on a surface of the lens.

13. The lighting device of claim 1, wherein the circumferential wall is substantially the shape of a truncated cone.

14. The lighting device of claim 1, wherein the opening is substantially circular.

15. A vehicle comprising a canopy, the canopy including a lighting device having a PAR form fit and comprising:
    a housing comprising a circumferential wall, the circumferential wall having an inner surface, an outer surface, a central axis, and an opening for light emission;
    a plurality of light emitting semiconductor devices, wherein each one of the plurality of light emitting semiconductor devices is mounted on a first surface of a substrate such that a peak emitted light intensity direction of each one of the plurality of light emitting semiconductor devices is directed substantially toward the central axis, and wherein a second surface of the substrate is in thermal contact with the inner surface of the circumferential wall; and
    a plurality of curved reflecting surfaces arranged between the plurality of light emitting semiconductor devices and the central axis, wherein the plurality of curved reflecting surfaces are arranged to reflect light emitted by the plurality of light emitting semiconductor devices through the opening of the circumferential wall.

16. The vehicle of claim 15, wherein the opening is substantially circular.

17. The vehicle of claim 15, wherein the circumferential wall and an inner surface of the canopy are each shaped so as to be in close proximity to each other.

18. The vehicle of claim 15, wherein the vehicle is an aircraft.

19. A lighting device for a vehicle, the lighting device having a PAR form fit and comprising:
    a housing comprising a circumferential wall, the circumferential wall having an inner surface, an outer surface, a central axis, and an opening for light emission;
    a plurality of light emitting semiconductor devices, wherein each one of the plurality of light emitting semiconductor devices is mounted on a first surface of a substrate such that a peak emitted light intensity direction of each one of the plurality of light emitting semiconductor devices is directed substantially toward the central axis, and wherein a second surface of the substrate is in thermal contact with the inner surface of the circumferential wall; and
    a plurality of curved reflecting surfaces arranged between the plurality of light emitting semiconductor devices and the central axis, wherein the plurality of curved reflecting surfaces are arranged to reflect light emitted by the plurality of light emitting semiconductor devices through the opening of the circumferential wall,
    wherein each one of the plurality of curved reflecting surfaces comprises a reflecting surface directed toward a respective light emitting semiconductor device and a rear surface directed toward the central axis, and the plurality of curved reflecting surfaces are arranged such that a central cavity is defined at least partially by the rear surfaces.

20. The lighting device of claim 19, further comprising a power supply at least partially disposed within the central cavity.

\* \* \* \* \*